(12) United States Patent
Misu

(10) Patent No.: US 10,291,817 B2
(45) Date of Patent: May 14, 2019

(54) MONOCHROME IMAGE FORMING APPARATUS PROCESSING MONOCHROME INPUT DATA UTILIZING A COLOR CONVERSION PROCESS THEREBY REDUCING TONER USAGE IN AN ECO MODE

(71) Applicant: KYOCERA Document Solutions Inc., Osaka (JP)

(72) Inventor: Kazuto Misu, Osaka (JP)

(73) Assignee: Kyocera Document Solutions, Inc. (JP)

( * ) Notice: Subject to any disclaimer, the term of this patent is extended or adjusted under 35 U.S.C. 154(b) by 19 days.

(21) Appl. No.: 15/788,761

(22) Filed: Oct. 19, 2017

(65) Prior Publication Data

US 2018/0124279 A1 May 3, 2018

(30) Foreign Application Priority Data

Oct. 31, 2016 (JP) .................................. 2016-212751

(51) Int. Cl.
*H04N 1/40* (2006.01)
*G06K 15/02* (2006.01)
*H04N 1/60* (2006.01)

(52) U.S. Cl.
CPC ..... *H04N 1/40012* (2013.01); *G06K 15/1817* (2013.01); *H04N 1/60* (2013.01); *H04N 1/6008* (2013.01); *H04N 1/6022* (2013.01)

(58) Field of Classification Search
CPC combination set(s) only.
See application file for complete search history.

(56) References Cited

U.S. PATENT DOCUMENTS

| 5,032,904 | A  | * | 7/1991  | Murai     | H04N 1/60 358/500 |
| 6,236,817 | B1 | * | 5/2001  | Kim       | G03G 15/0121 358/515 |
| 8,848,265 | B2 | * | 9/2014  | Matsumoto | H04N 1/40012 358/3.24 |
| 8,994,999 | B2 | * | 3/2015  | Misu      | G06F 3/1211 358/1.13 |
| 2009/0290883 | A1 | * | 11/2009 | Nakahara  | G03G 15/0126 399/27 |
| 2014/0029060 | A1 | * | 1/2014  | Matsumoto | H04N 1/6022 358/3.24 |

FOREIGN PATENT DOCUMENTS

JP     2006-284793     10/2006

* cited by examiner

*Primary Examiner* — Barbara D Reinier

(57) ABSTRACT

A monochrome image forming apparatus includes an image data supply unit for the color image forming apparatus that has a function to write input color image data including plural primary color data components into color buffers; and a color converter for a color image forming apparatus in which a color conversion unit reads the input color image data from the color buffers, performs an UCR process and a black generation process. The image data supply unit writes input monochrome image data of a single color to a monochrome buffer. In an eco printing mode, the color converter reads out the input monochrome image data to the color conversion unit as the plural primary color data components of the color image data, and performs the UCR process and the black generation process so as to make a toner consumption amount smaller than that in a normal printing mode.

3 Claims, 3 Drawing Sheets

MONOCHROME IMAGE FORMING APPARATUS PROCESSING MONOCHROME INPUT DATA UTILIZING A COLOR CONVERSION PROCESS THEREBY REDUCING TONER USAGE IN AN ECO MODE

CROSS-REFERENCE TO RELATED APPLICATIONS

This application relates to and claims priority rights from Japanese Patent Application No. 2016-212751, filed on Oct. 31, 2016, the entire disclosures of which are hereby incorporated by reference herein.

BACKGROUND

1. Field of the Present Disclosure

The present disclosure relates to a monochrome image forming apparatus.

2. Description of the Related Art

An image forming apparatus is capable of performing printing in "eco printing mode" that consumes a smaller amount of toner than that in a normal printing mode.

A color image forming apparatus, in "eco printing mode", performs an UCR (Under Color Removal) process and a black generation process so as to reduce a toner consumption amount as compared with the normal printing mode.

Contrarily, a monochrome image forming apparatus does not require an UCR process and a black generation process, and therefore, specially requires a processing circuit or a software process in order to reduce a toner consumption amount in "eco printing mode".

Therefore, for "eco printing mode", a large circuit scale, a complicated process, and a high cost (development cost, manufacturing cost and the like) are required for such monochrome image forming apparatus.

SUMMARY

A monochrome image forming apparatus according to an aspect of the present disclosure includes an image data supply unit for the color image forming apparatus, a color converter for a color image forming apparatus, and a controller. The image data supply unit for the color image forming apparatus has a function to write input color image data including plural primary color data components into color buffers. The color converter for a color image forming apparatus includes a color conversion unit configured to read the input color image data from the color buffers, perform an UCR process and a black generation process for the input color image data, and output output color image data including a black data component and plural primary color data components generated by the UCR process and the black generation process. The controller is configured to control the image data supply unit and the color conversion unit in accordance with a printing mode selected among a normal printing mode and an eco printing mode. Further, the color conversion unit performs the UCR process and the black generation process so as to make a toner consumption amount in the eco printing mode smaller than a toner consumption amount in the normal printing mode. The image data supply unit writes input monochrome image data of a single color to a monochrome buffer; and the color converter (a) reads out the input monochrome image data to the color conversion unit as the plural primary color data components of the input color image data in the eco printing mode, and (b1) performs the UCR process and the black generation process corresponding to the eco printing mode for the input monochrome image data using the color conversion unit in the eco printing mode.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
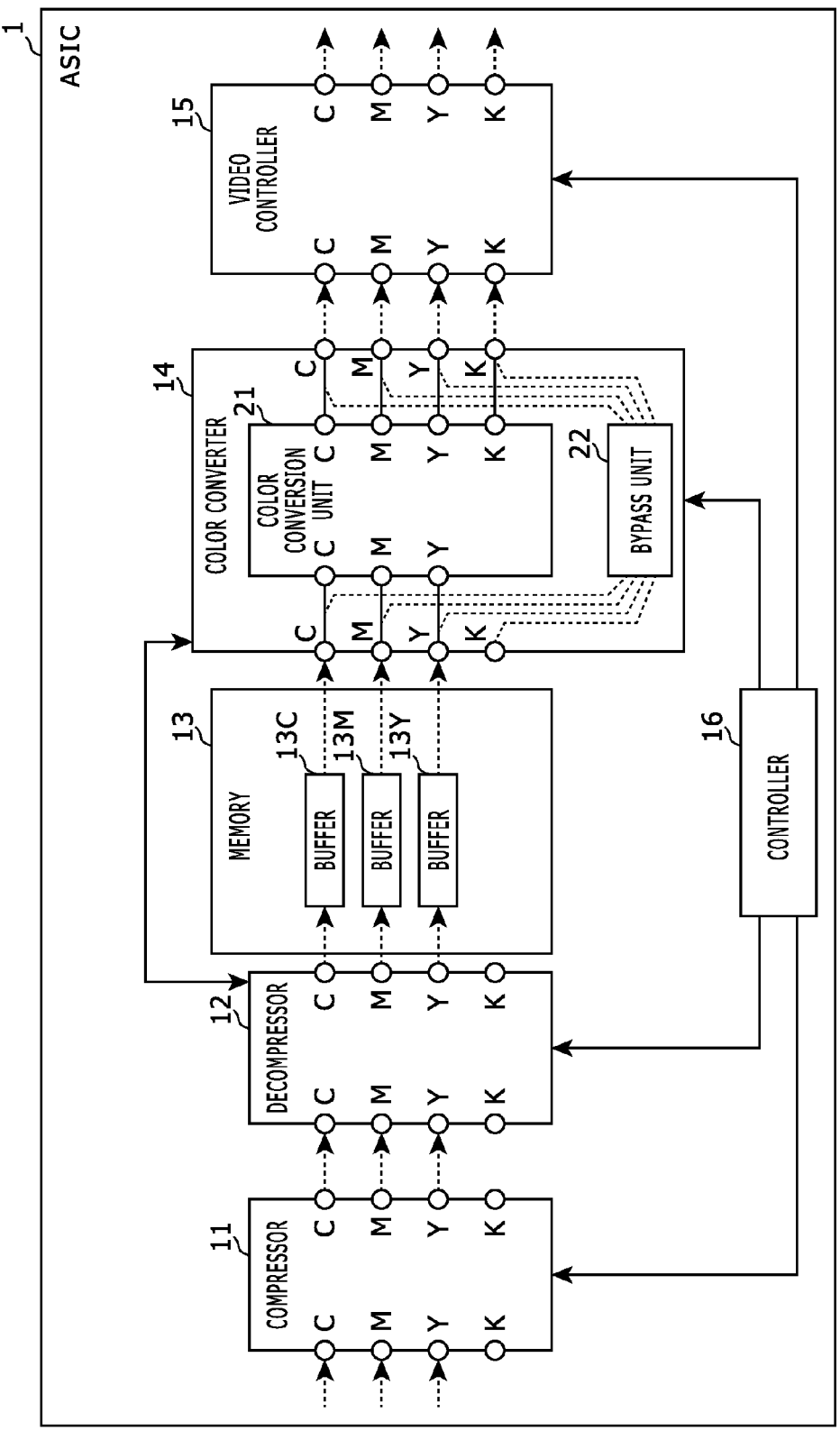
FIG. 1 shows a block diagram that indicates a hardware configuration of an ASIC (Application Specific Integrated Circuit) designed for a color image forming apparatus, used in a monochrome image forming apparatus according to an embodiment of the present disclosure.
Figure 2:
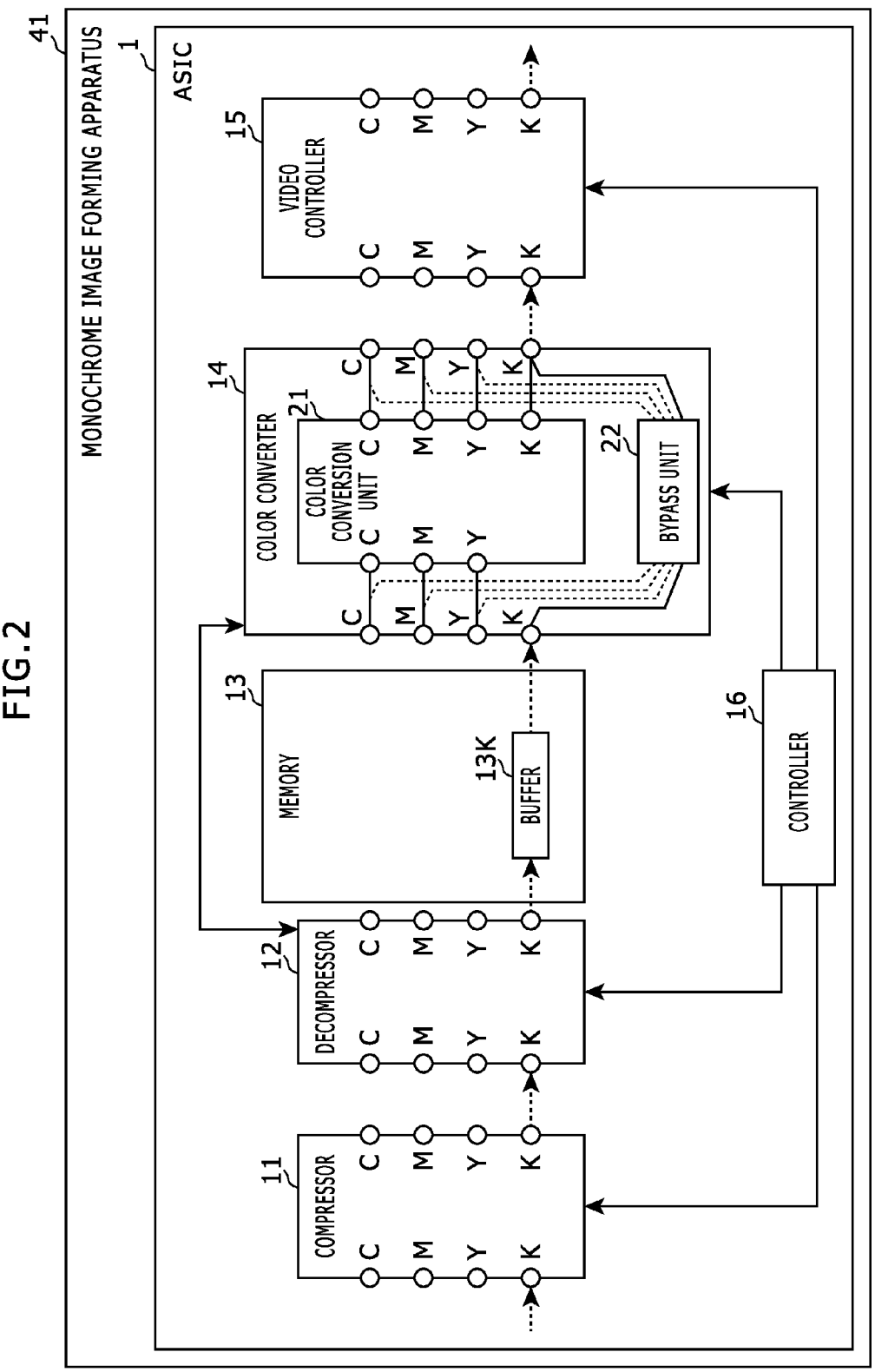
FIG. 2 shows a block diagram that indicates a configuration of the monochrome image forming apparatus according to an embodiment of the present disclosure (in a normal printing mode)
Figure 3:
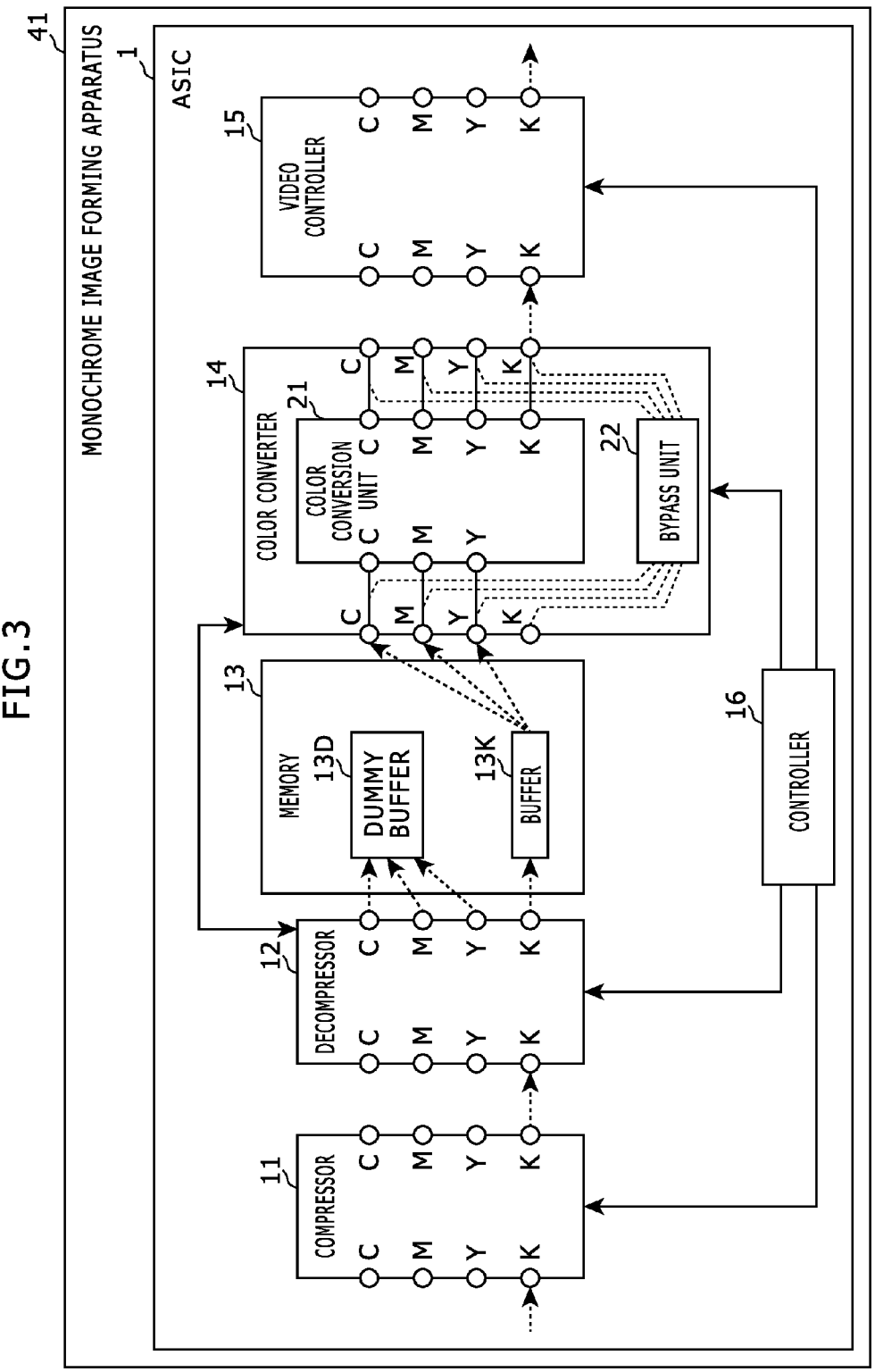
FIG. 3 shows a block diagram that indicates a configuration of the monochrome image forming apparatus according to an embodiment of the present disclosure (in an eco printing mode).

FIG. 1 shows a block diagram that indicates a hardware configuration of an ASIC (Application Specific Integrated Circuit) designed for a color image forming apparatus, used in a monochrome image forming apparatus according to an embodiment of the present disclosure. FIGS. 2 and 3 show block diagrams that indicate configurations of the monochrome image forming apparatus according to an embodiment of the present disclosure. The monochrome image forming apparatus 41 shown in FIGS. 2 and 3 is a monochrome image forming apparatus does not perform color printing and performs monochrome printing.

In the monochrome image forming apparatus 41 in this embodiment, the ASIC 1 designed for a color image forming apparatus as shown in FIG. 1 is used in a monochrome image forming apparatus having configurations shown in FIGS. 2 and 3. However, a behavior of a controller 16 is changed as mentioned below.

The ASIC 1 includes a compressor 11, a decompressor 12, a memory 13 such as a RAM (Random Access Memory), a color converter 14, a video controller 15, and a controller 16.

In the monochrome image forming apparatus 41 in this embodiment, the color converter 14 originally built in the ASIC 1, that is, a color converter designed for a color image forming apparatus, is used for implementing the eco printing mode for monochrome printing.

The compressor 11 compresses image data in accordance with a predetermined compression manner such as JPEG (Joint Photographic Experts Group). The compressor 11 is capable of compressing image data of plural color planes. The image data compressed by the compressor 11 is temporarily stored in an unshown memory area such as a page memory.

The decompressor 12 decompresses the compressed image data in accordance with a decompression manner corresponding to the compression manner of the compressor 11.

The decompressor 12 is an image data supply unit for a color image forming apparatus that is arranged in a previous stage of the color converter 14, and therefore, has a function to write input color image data including plural primary color data components to color buffers. Here, the input color image data includes image data of respective color planes of Cyan (C), Magenta (M), and Yellow (Y), and the color buffers are established as a buffer 13C for image data of the cyan plane, a buffer 13M for image data of the magenta plane, and a buffer 13Y for image data of the yellow plane. Here, each one of the buffer 13C, 13M, and 13Y is independently a ring buffer.

Therefore, the decompressor 12 writes decompressed image data of the color planes to the respective buffers 13C, 13M and 13Y as the input color data. Specifically, configurations (top addresses and the like) of the buffers 13C, 13M and 13Y are specified to the decompressor 12 by the controller 16, and the decompressor 12 determines a writing position (address) of the image data on the basis of the specified configurations.

The memory 13 is a memory in which the aforementioned color buffers or a monochrome buffer mentioned below are/is allocated.

The color converter 14 is a color converter designed for a color image forming apparatus, and includes a color conversion unit 21 and a bypass unit 22.

The color conversion unit 21 reads the input color image data from the color buffers, performs an UCR process and a black generation process for the input color image data, and outputs output color image data including a black data component and plural primary color data components generated by the UCR process and the black generation process. Here, the output color image data includes primary color data components of Cyan, Magenta, and Yellow, and a black (K) data component.

Further, the color conversion unit 21 performs the UCR process and the black generation process so as to make a toner consumption amount in the eco printing mode smaller than a toner consumption amount in the normal printing mode. The printing mode (the eco printing mode or the normal printing mode) is specified by the controller 16.

For each buffer 13$i$ ($i$=C, M, Y), the color converter reads the input color image data from the buffer 13$i$ after the decompressor 12 detects completion of writing the input color image data to the buffer 13$i$. Thus, before detecting the writing completion of the decompressor 12, the color converter 14 does not perform reading of the color image data. Further, after reading completion of the color converter 14, the decompressor 12 performs writing of subsequent input image data.

Specifically, configurations (top addresses and the like) of the buffers 13C, 13M and 13Y are specified to the color converter 14 by the controller 16, and the color converter 14 determines a reading position (address) of the image data on the basis of the specified configurations, and from a reading position corresponding to a color plane for which the writing completion is detected, reads image color data of this color plane.

The bypass unit 22 makes a bypass of the color conversion unit 21 in accordance with an instruction from the controller 16.

The video controller 15 performs image processing such as half toning and/or the like, and outputs the image data of each color plane after the image processing to an unshown print engine.

The controller 16 is a processor that acts, for example, in accordance with a control program, and controls internal processors such as the decompressor 12 and the color converter 14 in accordance with a printing mode selected among the normal printing mode and the eco printing mode. Further, as mentioned, the controller 16 specifies a writing position (i.e. a position of the buffer in the memory 13) of the input image data to the decompressor 12 and specifies a reading position (i.e. a position of the buffer in the memory 13) of the input image data to the color converter 14.

Meanwhile, as shown in FIG. 1, when assuming that the ASIC 1 is mounted in a color image forming apparatus, the controller 16 sets configurations of the buffer 13C, 13M, and 13Y to the decompressor 12 and the color converter 14, and turns off the bypass of the bypass unit 22, and thereby, from the decompressor 12 to the color conversion unit 21, input image data of Cyan, Magenta and Yellow is supplied through the buffers 13C, 13M and 13Y, and from the color conversion unit 21, output image data of Cyan, Magenta, Yellow and Black is outputted.

Contrarily, as shown in FIG. 2, in the monochrome image forming apparatus 41 in this embodiment, the controller 16 turns on the bypass of the bypass unit 22 in the normal printing mode. In this case, it is not required to read out the input image data to the color conversion unit 21, and therefore, a dummy buffer 13D is not necessary. In this case, input monochrome image data is directly supplied from the decompressor 12 to the video controller 15 through a buffer 13K and the bypass unit 13 as is.

As shown in FIG. 3, in the monochrome image forming apparatus 41 in this embodiment, the compressor 11 compresses monochrome image data in accordance with a predetermined compression manner such as JPEG, and the decompressor 12 decompresses the monochrome image data compressed by the compressor 11. Further, the decompressor 12 writes the input monochrome image data of a single color to the buffer 13K as a monochrome buffer, and the color converter 14 reads the input monochrome image data from the buffer 13K.

The color converter 14 (a) reads out the input monochrome image data from the buffer 13K to the color conversion unit 21 as plural primary color data components of color image data in the eco printing mode, and (b1) performs the UCR process and the black generation process corresponding to a current printing mode (i.e. the eco printing mode) for the input monochrome image data using the color conversion unit 21 in the eco printing mode.

Specifically, in the monochrome image forming apparatus 41 in this embodiment, the controller 16 sets a configuration (top position and the like) of the buffer 13K for monochrome image data to the decompressor 12 and the color converter 14. Here, the buffer 13K is also a ring buffer. Thus, all of reading positions of the input image data of Cyan, Magenta, Yellow and Black are set on the buffer 13K.

Consequently, the decompressor 12 writes the input monochrome image data of a single color to the buffer 13K as a monochrome buffer, and the color converter 14 reads the input monochrome image data from the buffer 13K.

Further, in the monochrome image forming apparatus 41 in this embodiment, in the eco printing mode, the controller turns off the bypass of the bypass unit 22, and sets configuration of the dummy buffer 13D to the decompressor 12 to specify the writing positions of the input image data of Cyan, Magenta and Yellow.

Therefore, writing of the input image data of Cyan, Magenta and Yellow is correctly completed, and reading out the input image data from the buffer 13K to the color conversion unit 21 is correctly started by the color converter 14. Further, the color conversion unit 21 performs the UCR process and the black generation process of the eco printing mode for input image data of Cyan, Magenta and Yellow that is set as the input monochrome image data of the buffer 13K (i.e. input image data of which input values of Cyan, Magenta and Yellow are same as each other and same as a value of the input monochrome image data). Consequently, a black data component after this UCR process and the black generation process is outputted as monochrome output image data in the eco printing mode.

It should be noted that in the monochrome image forming apparatus 41 in this embodiment, compressed image data of Cyan, Magenta and Yellow is not inputted to the decompressor 12 and therefore for this reason, it is not necessary to output the input image data of Cyan, Magenta and Yellow from the decompressor 12. However, if writing input image data of Cyan, Magenta and Yellow to an actual writable area (here, prepared as the aforementioned dummy buffer 13D) is not correctly completed, then reading out the input image data from the buffer 13K to the color conversion unit 21 is not correctly started by the color converter 14. Therefore, in order to cause the color converter 14 to start reading the input image data, writing of dummy input image data of Cyan, Magenta and Yellow to the dummy buffer 13D is performed.

The following part explains a behavior of the aforementioned monochrome image forming apparatus 41.

The controller 16 determines a printing mode (the eco printing mode or the normal printing mode) on the basis of a user operation, user setting data or the like, and sets the decompressor 12 and the color converter 14 as shown in FIG. 2 as mentioned if the printing mode is the normal printing mode or sets the decompressor 12 and the color converter 14 as shown in FIG. 3 as mentioned if the printing mode is the eco printing mode.

Consequently, in the normal printing mode, the monochrome image data outputted from the decompressor 12 is supplied as is to the video controller 15 through the buffer 13K and the bypass unit 22 of the color converter 14.

In the eco printing mode, the monochrome image data outputted from the decompressor 12 is supplied to the color converter 14 through the buffer 13K, and the UCR process and the black generation process of the eco printing mode are performed by the color conversion unit 21 of the color converter 14, and a black data component generated by the UCR process and the black generation process is supplied to the video controller 15 as monochrome output image data. Therefore, in this case, a toner consumption amount of Black is smaller than that in the normal printing mode.

As mentioned, in the monochrome image forming apparatus 41 in the aforementioned embodiment, the color converter 14 for a color image forming apparatus is used and has the normal printing mode and the eco printing mode, and the color conversion unit 21 of the color converter 14 performs a UCR process and a black generation process so as to make a toner consumption amount in the eco printing mode smaller than a toner consumption amount in the normal printing mode. The decompressor 12 writes input monochrome image data of a single color to the buffer 13K, and the color converter 14 (a) reads out the input monochrome image data from the buffer 13K to the color conversion unit 21 as the plural primary color data components of the color image data in the eco printing mode, and (b1) performs the UCR process and the black generation process corresponding to the eco printing mode for the input monochrome image data using the color conversion unit 21 in the eco printing mode.

Consequently, when the ASIC 1 for a color image forming apparatus is utilized to the monochrome image forming apparatus 41, using the color converter 14 originally built in the ASIC 1 for the color image forming apparatus, the eco printing mode is implemented in the monochrome image forming apparatus 41. Thus, it is not necessary to add a processing circuit or the like for the eco printing mode, cost increase of the monochrome image forming apparatus 41 for the eco printing mode is restrained.

Further, the aforementioned ASIC 1 is embodied by changing a control program of the controller 16 in an existent ASIC of a color image forming apparatus so as to perform the aforementioned behavior, and therefore for the aforementioned ASIC 1, a new circuit design and the like are not required.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, as shown in FIG. 3, the dummy buffer 13D is set as one buffer for Cyan, Magenta and Yellow. Alternatively, dummy buffers may be set for Cyan, Magenta and Yellow, respectively.

Further, in the aforementioned embodiment, a processor in a previous stage of the color converter 14 is the decompressor 12, but a processor in a previous stage of the color converter 14 is not limited to the decompressor 12.

What is claimed is:

1. A monochrome image forming apparatus that does not perform color printing and performs monochrome printing, comprising:

an image data supply unit for a color image forming apparatus that has a function to write input color image data including plural primary color data components into color buffers;

a color converter for the color image forming apparatus that comprises a color conversion unit configured to read the input color image data from the color buffers, perform an UCR process and a black generation process for the input color image data, and output output color image data including a black data component and plural primary color data components generated by the UCR process and the black generation process; and a controller configured to control the image data supply unit and the color conversion unit in accordance with a printing mode selected among a normal printing mode and an eco printing mode;

wherein the color conversion unit performs the UCR process and the black generation process so as to make a toner consumption amount in the eco printing mode smaller than a toner consumption amount in the normal printing mode; the image data supply unit writes input monochrome image data of a single color to a monochrome buffer; and the color converter (a) reads out the input monochrome image data to the color conversion unit as the plural primary color data components of the input color image data in the eco printing mode, and (b1) performs the UCR process and the black generation process corresponding to the eco printing mode for the input monochrome image data using the color conversion unit in the eco printing mode.

2. The monochrome image forming apparatus according to claim 1, wherein the color converter further comprises a bypass unit as a bypass of the color conversion unit, and (b2) in the normal printing mode, bypasses the color conversion unit with the bypass unit and outputs the input monochrome image data as output monochrome image data.

3. The monochrome image forming apparatus according to claim 1, wherein the color converter has a function to read the input color image data from the color buffers after the image data supply unit detects completion of writing the input color image data to the color buffers;

the image data supply unit performs writing dummy input color image data components to a dummy buffer; and the color converter reads the input monochrome image data from the monochrome buffer after the image data supply unit detects completion of writing the dummy input color image data to the dummy buffer.

* * * * *